(12) United States Patent
Clouqueur

(10) Patent No.: US 11,507,380 B2
(45) Date of Patent: Nov. 22, 2022

(54) BRANCH CONFIDENCE THROTTLE

(71) Applicant: ADVANCED MICRO DEVICES, INC., Santa Clara, CA (US)

(72) Inventor: Thomas Clouqueur, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 319 days.

(21) Appl. No.: 16/116,666

(22) Filed: Aug. 29, 2018

(65) Prior Publication Data
US 2020/0073669 A1 Mar. 5, 2020

(51) Int. Cl.
*G06F 9/38* (2018.01)

(52) U.S. Cl.
CPC .......... *G06F 9/3848* (2013.01); *G06F 9/3806* (2013.01)

(58) Field of Classification Search
None
See application file for complete search history.

(56) References Cited

U.S. PATENT DOCUMENTS

| | | | | |
|---|---|---|---|---|
| 2002/0066081 A1* | 5/2002 | Duesterwald | ....... | G06F 11/3471 712/E9.037 |
| 2006/0161762 A1* | 7/2006 | Eisen | ..................... | G06F 9/3844 712/E9.053 |
| 2008/0256345 A1* | 10/2008 | Bose | ..................... | G06F 1/3203 712/E9.055 |
| 2009/0063819 A1 | 3/2009 | Doing et al. | | |
| 2009/0150657 A1 | 6/2009 | Gschwind et al. | | |
| 2012/0124345 A1 | 5/2012 | Denman et al. | | |
| 2013/0205118 A1* | 8/2013 | Buyuktosunoglu | ... | G06F 9/3844 712/206 |
| 2014/0372736 A1* | 12/2014 | Greenhalgh | .......... | G06F 9/3806 712/239 |
| 2017/0249149 A1* | 8/2017 | Priyadarshi | ........... | G06F 9/3802 |
| 2018/0246811 A1* | 8/2018 | Bonanno | ............... | G06F 9/3806 |
| 2018/0349144 A1* | 12/2018 | Pal | ........................ | G06F 9/3848 |
| 2018/0365014 A1* | 12/2018 | Lin | ....................... | G06F 9/3802 |
| 2020/0012497 A1* | 1/2020 | Clouqueur | ............ | G06F 9/3806 |

OTHER PUBLICATIONS

Hennessy et al., Computer Architecture: A Quantitative Approach, 1990, Morgan Kaufmann publications, 4th edition, 121-130 (Year: 1990).*
International Search Report and Written Opinion dated Dec. 16, 2019 for International Application No. PCT/US2019/048120, 13 pages.
Extended European Search Report dated Apr. 21, 2022 for European Application No. 19853411.7, 6 pages.
International Preliminary Report on Patentability dated Mar. 11, 2021 for International Application No. PCT/US2019/048120, 10 pages.

* cited by examiner

*Primary Examiner* — Hyun Nam

(57) ABSTRACT

A processing system includes a processor with a branch predictor including one or more branch target buffer tables. The processor also includes a branch prediction pipeline including a throttle unit and an uncertainty accumulator. The processor assigns an uncertainty value for each of a plurality of branch predictions generated by the branch predictor and adds the uncertainty value for each of the plurality of branch predictions to an accumulated uncertainty counter associated with the uncertainty accumulator. The throttle unit of the branch prediction pipeline throttles operations of the branch prediction pipeline based on the accumulated uncertainty counter.

16 Claims, 4 Drawing Sheets

BRANCH CONFIDENCE THROTTLE

BACKGROUND

Processing units use branch prediction to predict the outcome of a branch instruction so that the processing unit can begin speculatively executing instructions following the predicted branch before the processing unit has evaluated the branch instruction. To predict the outcome of the branching instruction the processing unit uses information in a branch prediction structure, such as indirect branch predictors that redirect the flow of the program to an arbitrary instruction, a return address stack that includes return addresses for subroutines executing on the processing unit, conditional branch predictors that predict the direction (taken or not taken) of a conditional branch, and a branch target buffer that includes information predicting the location, type, and target addresses of branching instructions.

Some implementations of branch prediction structures use a branch history of results of branching instructions executed by processes that were previously, or are currently, executing on the processing unit. For example, if a branching instruction previously directed the program flow to a first address 90% of the time and a second address 10% of the time, a corresponding entry in the branch prediction structure predicts that the branching instruction will direct the program flow to the first address, thereby allowing the process to speculatively execute instructions along the branch beginning at the first address without waiting for evaluation of the branching instruction. If the predicted branch turns out to be incorrect when the branching instruction is evaluated, speculative execution along the incorrectly predicted branch is suspended and the state of the processing unit is rolled back to the state at the branching instruction to begin executing along the correct branch. More specifically, both the branch prediction unit and the fetch unit are rolled back to process from the correct target of the branch, or the address after the branch if the branch was not taken.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Speculative execution leads to wasted work by a processor when a branch predictor incorrectly predicts the sequence of instructions to be fetched. Such wasted work wastes power due to processing the instructions following the predicted branch. Incorrect branch prediction also wastes processing bandwidth when a core is running in multi-thread mode in which the pipeline and resources are shared.

In various branch prediction pipelines, a branch predictor at the front end of a prediction pipeline predicts every cycle an address from which instructions should be fetched. It is unknown for a number of cycles whether the predictions being made are correct. As long as the predictions are correct, it is computationally efficient to keep the prediction pipeline full. However, when predictions are made incorrectly, the prediction pipeline needs to be flushed which results in a performance penalty associated with the flushing. Another penalty of having made the wrong predictions is that not only are resources wasted in executing instructions that are along the wrong path, but other threads running on the same system are penalized as the incorrectly predicted paths consume resources that other threads could have otherwise used. For example, in a single thread mode, there is no current solution addressing the wasted work caused by redirects. In multi-thread mode, competitive sharing of computing resources is based on fairness criteria assuming that each thread is executing instructions on the correct path and does not account for potential misprediction from different threads.

To reduce the amount of wasted work in order to save power and to improve multi-thread performance, FIGS. 1-4 describe a system and method for performing branch confidence throttling. In one embodiment, a processor includes a branch predictor having one or more branch target buffer (BTB) tables and a branch prediction pipeline including a throttle unit and an uncertainty accumulator. The processor assigns an uncertainty value for each of a plurality of branch predictions generated by the branch predictor. The uncertainty accumulator adds the uncertainty value for each of the plurality of branch predictions to an accumulated uncertainty counter associated with the uncertainty accumulator. The throttle unit throttles operations of the branch prediction pipeline based on the accumulated uncertainty counter, slowing down threads that are less likely to be on the correct path, and by doing so, saves power by not executing instructions that are likely to be flushed.

Figure 1:
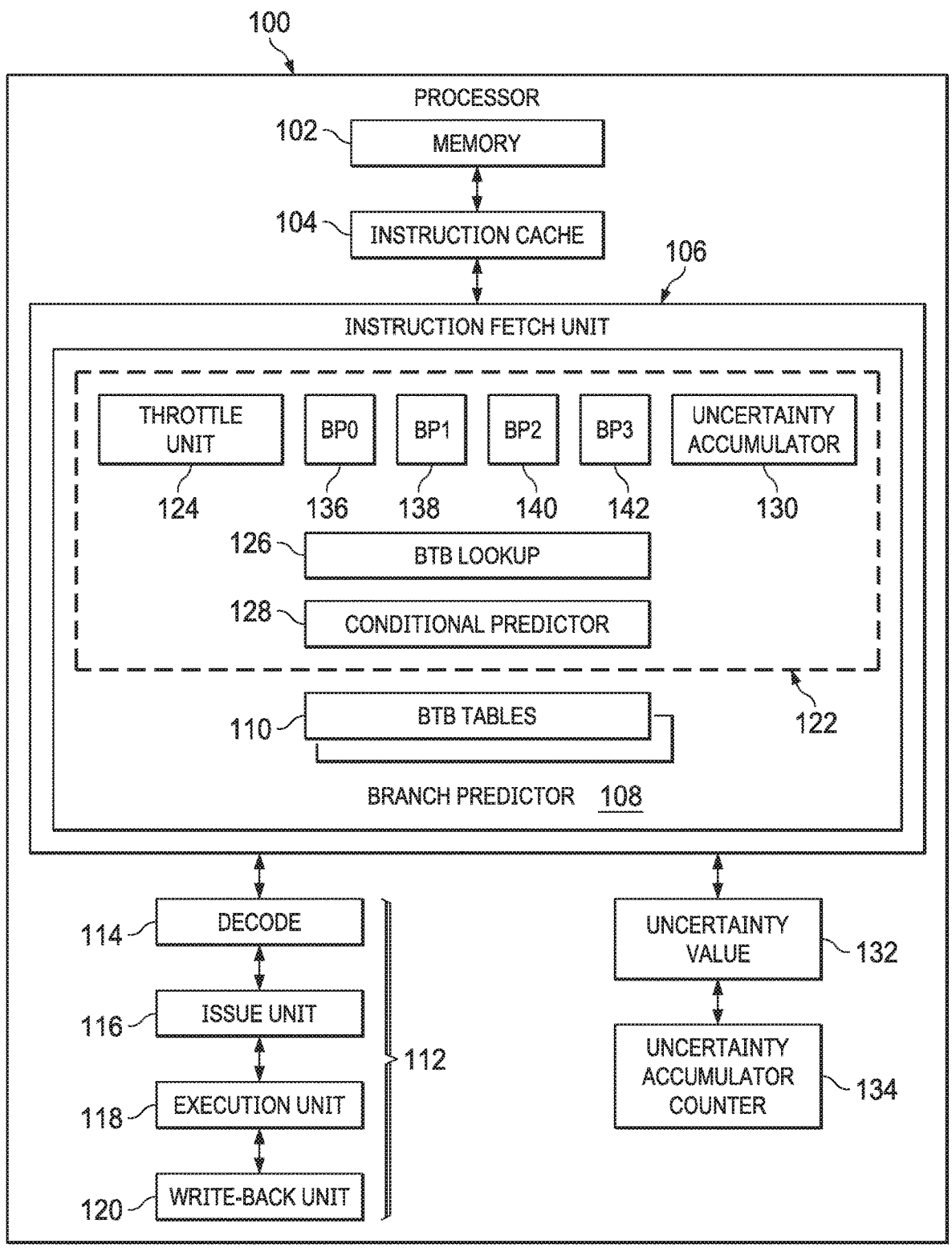
FIG. 1 is a block diagram of a processor in accordance with some embodiments.

FIG. 1 is a block diagram of a processor 100 implementing branch confidence throttling in accordance with some embodiments. The processor 100 includes a memory 102, an instruction cache 104, an instruction fetch unit 106, a branch predictor 108, one or more branch target buffer (BTB) tables 110, and a processing pipeline 112. In various embodiments, the processing system is included within a computer processor or otherwise distributed within a computer system. The memory 102 includes any type of volatile or nonvolatile memory, such as cache memory, for storing instructions and data. The instruction cache 104 accesses instructions from memory 102 and stores the instructions to be fetched. In various embodiments, the memory 102 and instruction cache 104 includes multiple cache levels. Further, the processor 100 also includes a data cache (not shown).

In FIG. 1, simplified examples of the instruction fetch unit 106 and the processing pipeline 112 are depicted for ease of illustration. The branch predictor 108 of the instruction fetch unit 106 generates branch target addresses that are stored or provided to the one or more BTB tables (also commonly referred to as BT buffers and BTBs) 110. The branch predictor 108 is implemented, at least in part, within the instruction fetch unit 106 of a processor (e.g., processor 100 of FIG. 1). While BTB tables 110 are shown internal to the branch predictor 108 in FIG. 1, the BTB tables 110 may or may not be located in the processor 100 proximate to certain elements of the instruction fetch unit 106 or the branch predictor 108. In some embodiments, the processor 100 further includes multiple instruction fetch units 106 and processing pipelines 112. The processing pipeline 112 includes a decode unit 114, an issue unit 116, an execution stage 118, and a write-back unit 120.

In various embodiments, the entire instruction fetch unit 106 and/or the branch predictor 108 is also part of the processing pipeline 112. The processing pipeline 112 can also include other features, such as error checking and handling logic, one or more parallel paths through the processing pipeline 112, and other features known in the art. While a forward path through the processing system 112 is depicted in FIG. 1, other feedback and signaling paths may be included between elements of the processor 100.

The instruction fetch unit 106 fetches instructions from the instruction cache 104 for further processing by the decode unit 114. In one embodiment, the instruction fetch unit 106 includes the branch predictor 108 and also includes other branch prediction logic (not shown). Alternatively, in other embodiments, the branch predictor 108 is located separately from the instruction fetch unit 106. The branch predictor 108 is an example of a processing circuit to implement branch confidence throttling, as discussed in more detail below.

The decode unit 114 decodes instructions and passes the decoded instructions, portions of instructions, or other decoded data to the issue unit 116. The issue unit 116 analyzes the instructions or other data and transmits the decoded instructions, portions of instructions, or other data to one or more execution units 118 based on the analysis. The one or more execution units 118 include execution units such as fixed-point execution units, floating-point execution units, load/store execution units, vector execution units, and the like for executing the instructions. The write-back unit 120 writes results of instruction execution back to a destination resource (not shown). The destination resource may be any type of resource, including registers, cache memory, other memory, I/O circuitry to communicate with other devices, other processing circuits, or any other type of destination for executed instructions or data.

The branch predictor 108 includes a branch prediction pipeline 122 that performs prediction by comparing an instruction address against previously executed instruction addresses that have been stored in the BTB tables 110. In this type of architecture, many instructions can be "in flight"; that is, in various stages of execution, simultaneously. The operation of the branch prediction pipeline 122 is presented in greater detail below with regard to FIGS. 2 and 3. Each stage within the branch prediction pipeline 122 generally occurs in order. To achieve high performance, one new instruction enters the branch prediction pipeline 122 every cycle, and each instruction in the pipeline moves to a new stage. Each stage takes inputs and produces outputs, which are stored in an output buffer associated with the stage. One stage's output buffer is typically the next stage's input buffer. Such an arrangement permits all the stages to work in parallel and therefore yields a greater throughput than if each instruction had to pass through the entire branch prediction pipeline 122 before the next instruction can enter the pipeline. When the branch prediction pipeline 122 is delayed or has to be cleared, latency is created in the processing of each instruction in the pipeline.

Prediction usually saves time in processing because successful prediction allows the processor 100 to skip execution of steps for acquiring a target address. The processor 100 saves time by looking up an address for a next step of execution in the BTB tables 110. For example, in some embodiments, the BTBs 110 store branch addresses, target addresses, and history data to predict the branch direction (e.g., taken, not taken). Branch address information is stored in order to identify which BTB entry to use for a prediction (e.g., the entry whose branch address is equal to or closest following the search address). The target address is used to initiate instruction fetching for the target of a predicted taken branch. The history data, taken/not-taken, is used to predict the branch's direction as either taken or not-taken based on previous outcomes of the branch. In other embodiments, direction prediction information may come from additional (e.g., hierarchical) structures accessed in parallel with the BTBs 110.

The branch prediction pipeline 122 includes a throttle unit 124, a plurality of prediction pipeline stages BP0-BP3 (e.g., BP0 136, BP1 138, BP2 140, BP3 142), a BTB lookup 126, a conditional predictor 128, and an uncertainty accumulator 130. In terms of pipelining, such as in the branch prediction pipeline 122 of FIG. 1, one or more of the BTB tables 110 is read for every prediction flow unless the read is suppressed for power savings. According to some embodiments, a first BTB read is initiated in a first stage designated BP0. Subsequent stages are designated as BP1, BP2, and so forth as stages in the branch prediction pipeline 122. It will be appreciated that in FIG. 1 and in other figures that the illustrated pipelines are simplified in order to provide a clear example and to avoid unnecessarily obscuring the embodiment(s) of the invention being presented in the figures. For example, an illustrated pipeline stage may represent multiple actual pipeline stages or where two or more illustrated pipeline stages can be executed concurrently they may be combined into the same pipeline stage in a particular implementation or embodiment. It will also be understood that while the function of a particular pipeline stage may be explained with reference to a particular portion of a particular thread, a pipeline actually works to perform such functions on many such portions of one or more threads concurrently.

In one embodiment, a throttling mechanism (e.g., the throttle unit 124) is implemented at the front end of the branch prediction pipeline 122 (i.e., the throttle unit 124 is positioned at the beginning of the branch prediction pipeline 122). In various embodiments, the throttle unit 124 starts prediction flows based on resource availability and arbitrates between multiple independent processes or execution threads running on the processor 100. As illustrated, the BTB lookup 126 and the conditional predictor 128 stages span over multiple cycles of the branch prediction pipeline 122 (i.e., spanning over prediction pipeline stages BP0-BP3).

The conditional predictor 128 assigns a confidence level for each branch prediction generated by the branch predictor 108 that relates to the probability that the current prediction made at the head of the speculation stream is not going to be flushed. Although described here in the context of conditional predictor 128 assigning a confidence level for each of the plurality of branch predictions generated by the branch predictor, those skilled in the art will recognize that various other predictors can be used without departing from the scope of this disclosure. For example, in other embodiments, an indirect predictor (not shown) or a return address predictor (not shown) provides the uncertainty value.

In one embodiment, the conditional predictor 128 performs prediction confidence grading and classifies each branch prediction as a high-confidence prediction, a medium-confidence prediction, or a low-confidence prediction. For example, for a tagged geometric length (TAGE) predictor, high-confidence predictions include predictions made with a strong bimodal or saturated 3-bit counter from TAGE tables, and generally have misprediction rates lower than 1%. Medium-confidence predictions include predictions made with a nearly saturated 3-bit counter from TAGE tables, and generally have misprediction rates in the range of 8-12%. Low-confidence predictions include predictions made with a weak bimodal or weak/nearly-weak 3-bit counter from TAGE tables, and generally have misprediction rates higher than 30%. Additionally, as described in further detail below, for each branch prediction generated by the branch predictor 108, the processor 100 assigns an uncertainty value to each prediction.

In other embodiments, various confidence grading systems can be used, including deriving a confidence level from the specific information of each prediction such as the branch type, the age of BTB entry used to predict the branch, the "strength" of the prediction from the conditional or indirect predictor involved in the prediction, or special conditions such as predicting a return with an underflowing return address stack, and so forth as understood by those in the art. In various embodiments, the processor 100 assigns the uncertainty value 132 for each branch prediction based at least in part on the above-discussed confidence levels assigned by the conditional predictor 128 and the number of dynamic branches predicted. For example, in one embodiment, each branch prediction is assigned an uncertainty value by the processor 100 ranging from 0 to 10 based on prediction confidence grading. For example, a high-confidence prediction is assigned an uncertainty value of 0, a medium-confidence prediction is assigned an uncertainty value in the range of 1-4, and a low confidence prediction is assigned an uncertainty value in the range of 5-10.

The uncertainty accumulator 130 is positioned at the back end of the branch prediction pipeline 122 (i.e., the uncertainty accumulator 130 is positioned at the end of the branch prediction pipeline 122). The uncertainty accumulator 130 adds the uncertainty value 132 assigned to each prediction to an accumulated uncertainty counter 134 associated with the uncertainty accumulator 130. That is, the uncertainty accumulator 130 is incremented at the back end of the branch prediction pipeline 122. Additionally, the uncertainty value assigned to each prediction is subtracted from the accumulated uncertainty counter 134 when the corresponding branch prediction is retired or flushed from the branch prediction pipeline 122. That is, the accumulated uncertainty counter 134 is decremented when branch predictions are no longer in flight in the processor 100. Thus, the various stages of the branch prediction pipeline 122 include assigning an uncertainty value to each prediction and accumulating the uncertainty values across all the predictions that are in flight by adding the uncertainty value of new predictions at the uncertainty accumulator 130 stage and subtracting the uncertainty value of predictions that are retired or flushed. In this manner, the uncertainty accumulator 130 presents what is in flight—instructions that have been predicted but not yet retired.

Based on whether the accumulated uncertainty counter 134 exceeds one or more uncertainty thresholds, the throttle unit 124 throttles operations of the branch prediction pipeline 122 and makes performance/power tradeoffs based on the confidence that the branch predictor 108 is on the correct path. That is, the accumulated uncertainty of in-flight branch predictions is compared against a set of multiple thresholds and an increasingly severe throttling is enforced as the accumulated uncertainty exceeds the different thresholds.

In one embodiment, the throttle unit 124 reduces a prediction rate for a first execution thread based on the accumulated uncertainty counter 134 exceeding one or more uncertainty thresholds. For example, when the processor 100 is in a single-thread mode and the accumulated uncertainty counter 134 exceeds one or more of the uncertainty thresholds, the throttle unit 124 instructs the branch predictor 108 to skip predictions for one or more cycles in the future. In another embodiment, when the processor 100 is in a multi-thread mode and the accumulated uncertainty counter 134 exceeds one or more of the uncertainty thresholds, the throttle unit 124 instructs the branch predictor 108 to allocate processing bandwidth by assigning cycles that would have been used for generating branch predictions from a first execution thread to a second execution thread for one or more cycles in the future.

Throttling causes an execution thread to not issue any prediction in a cycle where it would have otherwise met all the criteria for issuing a prediction, in such a way that it would yield to another execution thread or create a bubble cycle if no other execution thread can take advantage of the yielding (e.g., when the processor 100 is operating in single thread mode). For example, in a single-thread mode, throttling enables saving power and in multi-thread mode, throttling enables both power savings and performance improvement by yielding to other execution threads. By assigning uncertainty values to each prediction and selecting the thresholds and associated prediction rate, throttling reduces wasted work with minimum impact to the performance of the execution thread being throttled. The savings in wasted work translate into power savings and/or multi-thread performance benefits.

Figure 2:
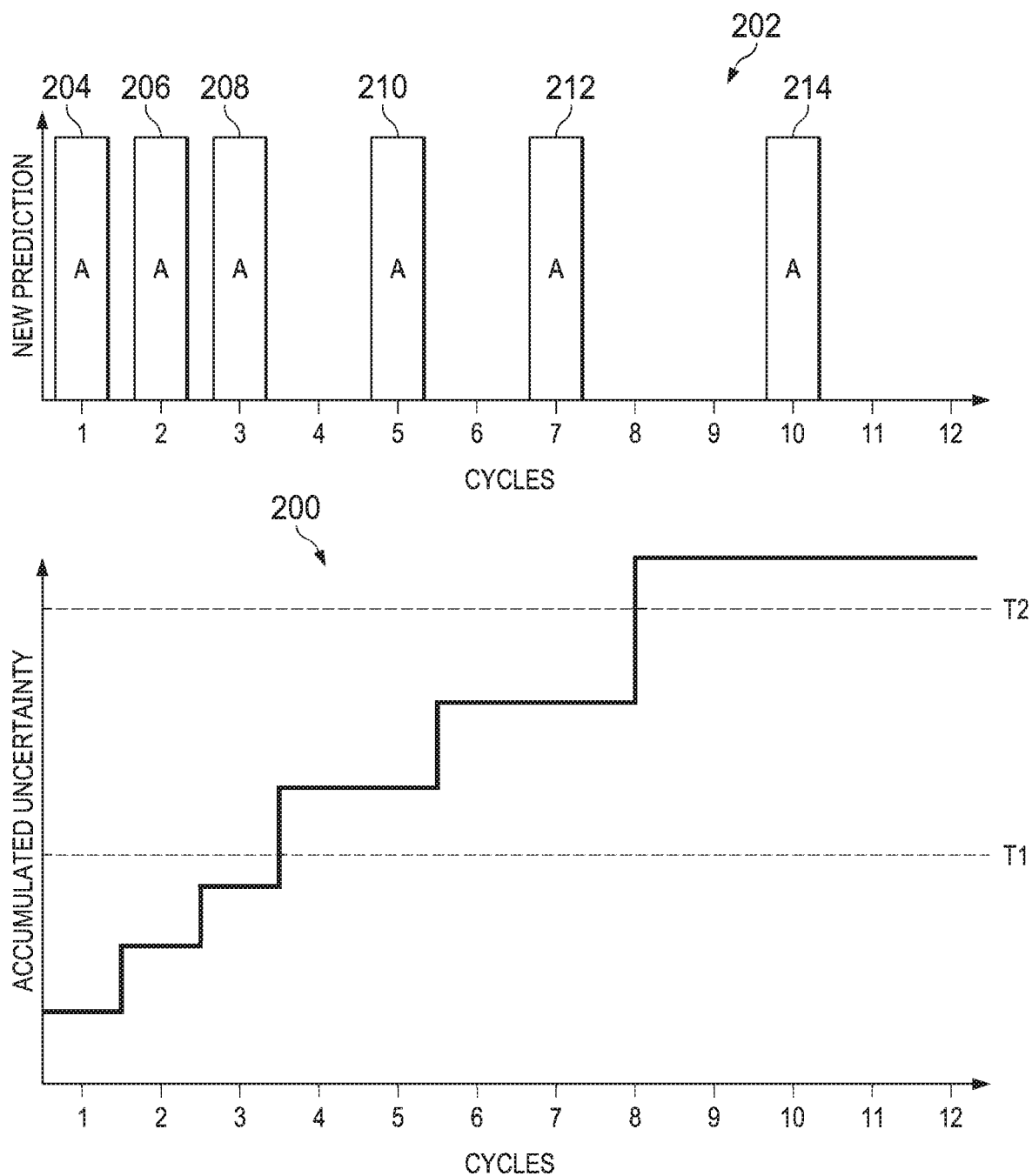
FIG. 2 is a diagram of prediction pipeline throttling in a single-thread mode in accordance with some embodiments.

FIG. 2 is a diagram of prediction pipeline throttling in a single-thread mode in accordance with some embodiments. Plot 200 illustrates the value of an accumulated uncertainty counter associated with a first execution thread (i.e., thread A in this example) as a function of time (measured in cycles) during branch prediction operations. Plot 202 illustrates new predictions entering the branch prediction pipeline (such as branch prediction pipeline 122 of FIG. 1) as a function of time (measured in cycles) during branch prediction operations. The horizontal axes of plots 200 and 202 indicate the time (in units of cycles) increasing from left to right. The vertical axis of plot 200 indicates the value of the accumulated uncertainty counter (in arbitrary units).

As illustrated in plot 200, the new prediction 204 at cycle 1 and the new prediction 206 at cycle 2 each result in an increase to the accumulated uncertainty counter. However, the value of the accumulated uncertainty counter is less than a first uncertainty threshold T1. Thus, operations of the branch prediction pipeline proceed as normal with one new prediction entering the branch prediction pipeline 122 every cycle, and each instruction already in the pipeline moves to a new stage.

An uncertainty value associated with the new prediction 208 entering the branch prediction pipeline 122 at cycle 3 is added to the accumulated uncertainty counter. After adding the uncertainty value associated with the new prediction 208, the value of the accumulated uncertainty counter increases above the first uncertainty threshold T1. Accordingly, the throttle unit 124 of the branch prediction pipeline 122 begins throttling of branch prediction pipeline operations at a first level of throttling in the next cycle of execution (i.e., cycle 4). The example of FIG. 2 assumes that each prediction is made in one cycle so that the uncertainty accumulator 130 represents accumulated uncertainty at the front of the pipeline where the throttle unit 124 operates.

At cycle 4, the throttle unit 124 inserts a stall into the branch prediction pipeline 122 by not issuing a new prediction. A new prediction 210 enters the branch prediction pipeline 122 at cycle 5. Thus, the throttle unit 124 throttles branch prediction pipeline operations when the accumulated uncertainty counter increases above the first uncertainty threshold T1 by generating a new prediction every other cycle instead of every cycle. As illustrated in plot 200, the new prediction 210 at cycle 5 results in an increase to the accumulated uncertainty counter (e.g., due to being another medium-confidence or low-confidence prediction). However, the value of the accumulated uncertainty counter is less than a second uncertainty threshold T2 but greater than the first uncertainty threshold T1. Thus, operations of the branch prediction pipeline proceed at the first level of throttling with one new prediction entering the branch prediction pipeline 122 every other cycle, and each instruction already in the pipeline moves to a new stage each cycle.

At cycle 6, the throttle unit 124 inserts a stall into the branch prediction pipeline 122 by not issuing a new prediction. A new prediction 212 enters the branch prediction pipeline 122 at cycle 7. An uncertainty value associated with the new prediction 212 entering the branch prediction pipeline 122 at cycle 7 is added to the accumulated uncertainty counter. However, after adding the uncertainty value associated with the new prediction 212, the value of the accumulated uncertainty counter increases above the second uncertainty threshold T2. Accordingly, the throttle unit 124 of the branch prediction pipeline 122 begins throttling of branch prediction pipeline operations at a second level of throttling in the next cycle of execution (i.e., cycle 8).

At cycles 8 and 9, the throttle unit 124 inserts a stall into the branch prediction pipeline 122 by not issuing a new prediction during either cycle 8 or cycle 9. A new prediction 214 does not enter the branch prediction pipeline 122 until cycle 10. Thus, the throttle unit 124 throttles branch prediction pipeline operations when the accumulated uncertainty counter increases above the second uncertainty threshold T2 by generating a new prediction every three cycles. Those skilled in the art will recognize that throttling is described here in the context of issuing new predictions every two cycles (e.g., at the first level of throttling) and every three cycles (e.g., at the second level of throttling), any manner of reducing the rate at which new instructions are introduced into the branch prediction pipeline 122 and reducing the amount of power and compute resources dedicated to a given execution thread may be utilized without departing from the scope of this disclosure.

Figure 3:
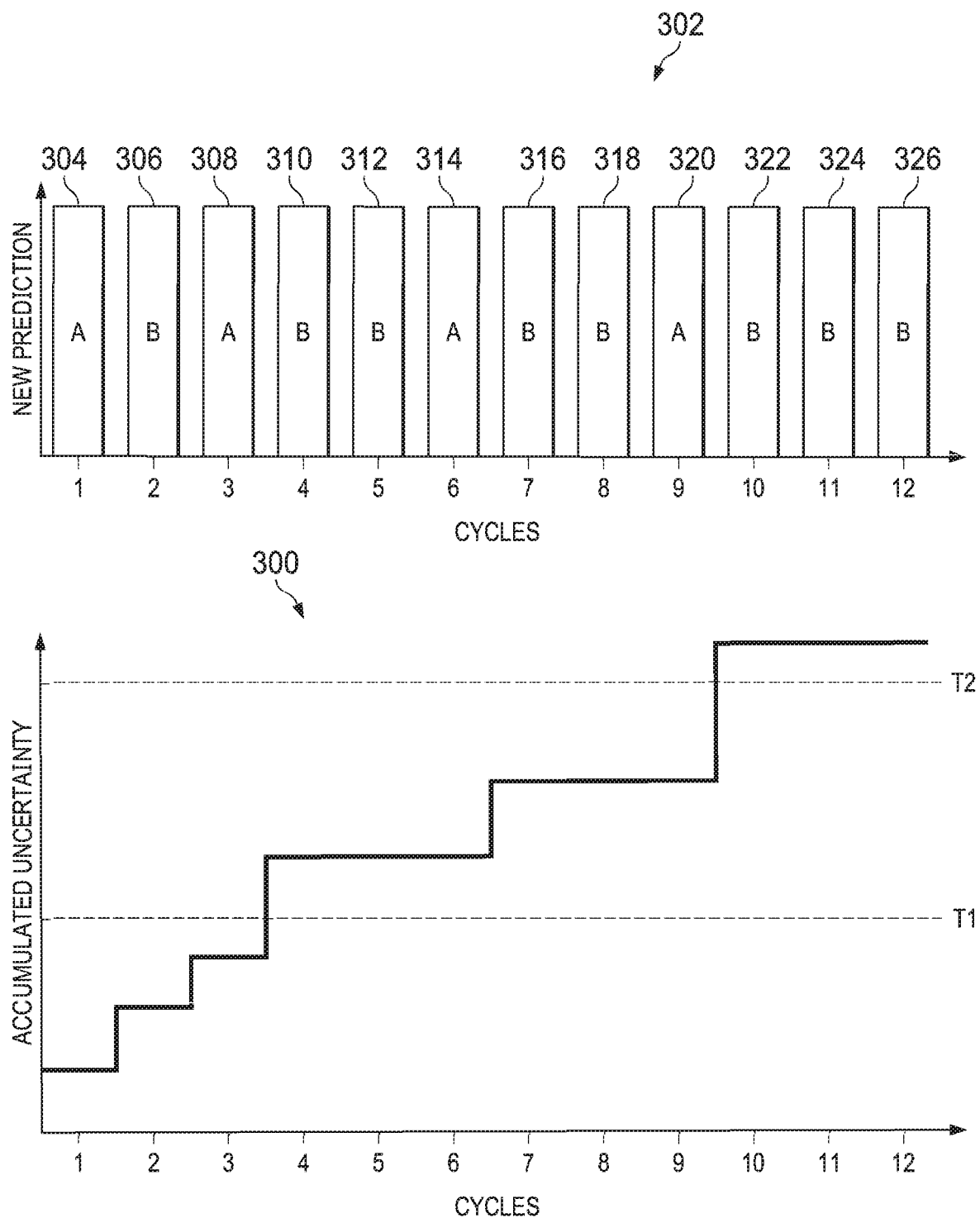
FIG. 3 is a diagram of prediction pipeline throttling in a multi-thread mode in accordance with some embodiments.

For example, FIG. 3 is a diagram of prediction pipeline throttling in a multi-thread mode in accordance with some embodiments. As shown in FIG. 3, rather than skipping predictions, processing bandwidth is allocated to other execution threads that are able to more effectively utilize execute cycles (e.g., other execution threads having higher confidence levels that prediction is on the correct path).

Plot 300 illustrates the value of an accumulated uncertainty counter associated with a first execution thread (i.e., thread A in this example) as a function of time (measured in cycles) during branch prediction operations. Plot 302 illustrates new predictions entering the branch prediction pipeline (such as branch prediction pipeline 122 of FIG. 1) as a function of time (measured in cycles) during branch prediction operations. The horizontal axes of plots 300 and 302 indicate the time (in units of cycles) increasing from left to right. The vertical axis of plot 300 indicates the value of the accumulated uncertainty counter (in arbitrary units).

As illustrated in plot 300, the new prediction 304 at cycle 1 and the new prediction 306 at cycle 2 each result in an increase to the accumulated uncertainty counter. However, the value of the accumulated uncertainty counter is less than a first uncertainty threshold T1. Thus, operations of the branch prediction pipeline proceed as normal. In particular, for each cycle of the branch prediction pipeline 122 the fetch alternates between one new prediction for a first thread (e.g., thread A) and a second thread (e.g., thread B), expressed as follows: ABABAB, and each instruction already in the pipeline moves to a new stage.

An uncertainty value associated with the new prediction 308 entering the branch prediction pipeline 122 at cycle 3 is added to the accumulated uncertainty counter. After adding the uncertainty value associated with the new prediction 308, the value of the accumulated uncertainty counter increases above the first uncertainty threshold T1. Accordingly, the throttle unit 124 of the branch prediction pipeline 122 begins throttling of branch prediction pipeline operations for execution thread A at a first level of throttling in the next cycle of execution (i.e., cycle 4). For example, rather than alternating between thread A and thread B, the throttle unit 124 selects thread B for processing more often: for example, thread B can be selected for two-thirds of the branch prediction pipeline cycles, expressed as follows: ABBABB.

At cycle 4 and cycle 5, the throttle unit 124 throttles predictions associated with execution thread A by not issuing a new prediction. Instead, the throttle unit 124 instructs the branch predictor 108 to assign cycles for generating new branch predictions to thread B and generates new predictions 310 and 312 for thread B. A new prediction 314 enters the branch prediction pipeline 122 for thread A at cycle 6. Thus, the throttle unit 124 throttles branch prediction pipeline operations when the accumulated uncertainty counter for thread A increases above the first uncertainty threshold T1 by generating a new prediction every third cycle instead of every other cycle. As illustrated in plot 300, the new prediction 314 at cycle 6 results in an increase to the accumulated uncertainty counter (e.g., due to being another medium-confidence or low-confidence prediction). However, the value of the accumulated uncertainty counter is greater than a second uncertainty threshold T2 but less than the first uncertainty threshold T1. Thus, operations of the branch prediction pipeline proceed at the first level of throttling with one new prediction for thread A entering the branch prediction pipeline 122 every third cycle, and each instruction already in the pipeline moves to a new stage each cycle.

A new prediction 316 and a new prediction 318 for thread B enters the branch prediction pipeline 122 at cycles 7 and 8, respectively. A new prediction 320 for thread A enters the branch prediction pipeline 122 at cycle 9. An uncertainty value associated with the new prediction 320 entering the branch prediction pipeline 122 at cycle 9 is added to the accumulated uncertainty counter. However, after adding the uncertainty value associated with the new prediction 320, the value of the accumulated uncertainty counter increases above the second uncertainty threshold T2. Accordingly, the throttle unit 124 of the branch prediction pipeline 122 begins throttling of branch prediction pipeline operations at a second level of throttling in the next cycle of execution (i.e., cycle 8). For example, at the second level of throttling, the throttle unit 124 selects thread B for processing more often: for example, thread B can be selected for 75% of the branch prediction pipeline cycles, expressed as follows: ABBBABBB.

At cycles 10, 11, and 12, the throttle unit 124 throttles predictions associated with execution thread A by not issuing a new prediction. Instead, the throttle unit 124 instructs the branch predictor 108 to allocate processing bandwidth to execution thread B and generates new predictions 322, 324, and 326 for thread B at cycles 10, 11, and 12, respectively. A new prediction for thread A does not enter the branch prediction pipeline 122 until cycle 13 (not shown). Thus, the throttle unit 124 throttles branch prediction pipeline operations for thread A when the accumulated uncertainty counter increases above the second uncertainty threshold T2 by generating a new prediction for thread A every four cycles. Those skilled in the art will recognize that throttling is described here in the context of issuing new predictions every three cycles (e.g., at the first level of throttling) and every four cycles (e.g., at the second level of throttling), any manner of reducing the rate at which new instructions are introduced into the branch prediction pipeline 122 and reducing the amount of power and compute resources dedicated to a given execution thread may be utilized without departing from the scope of this disclosure. In other embodiments, the throttling can include differing number of cycles between issuing new predictions. However, the amount of throttling generally increases as the accumulated uncertainty increases.

Figure 4:
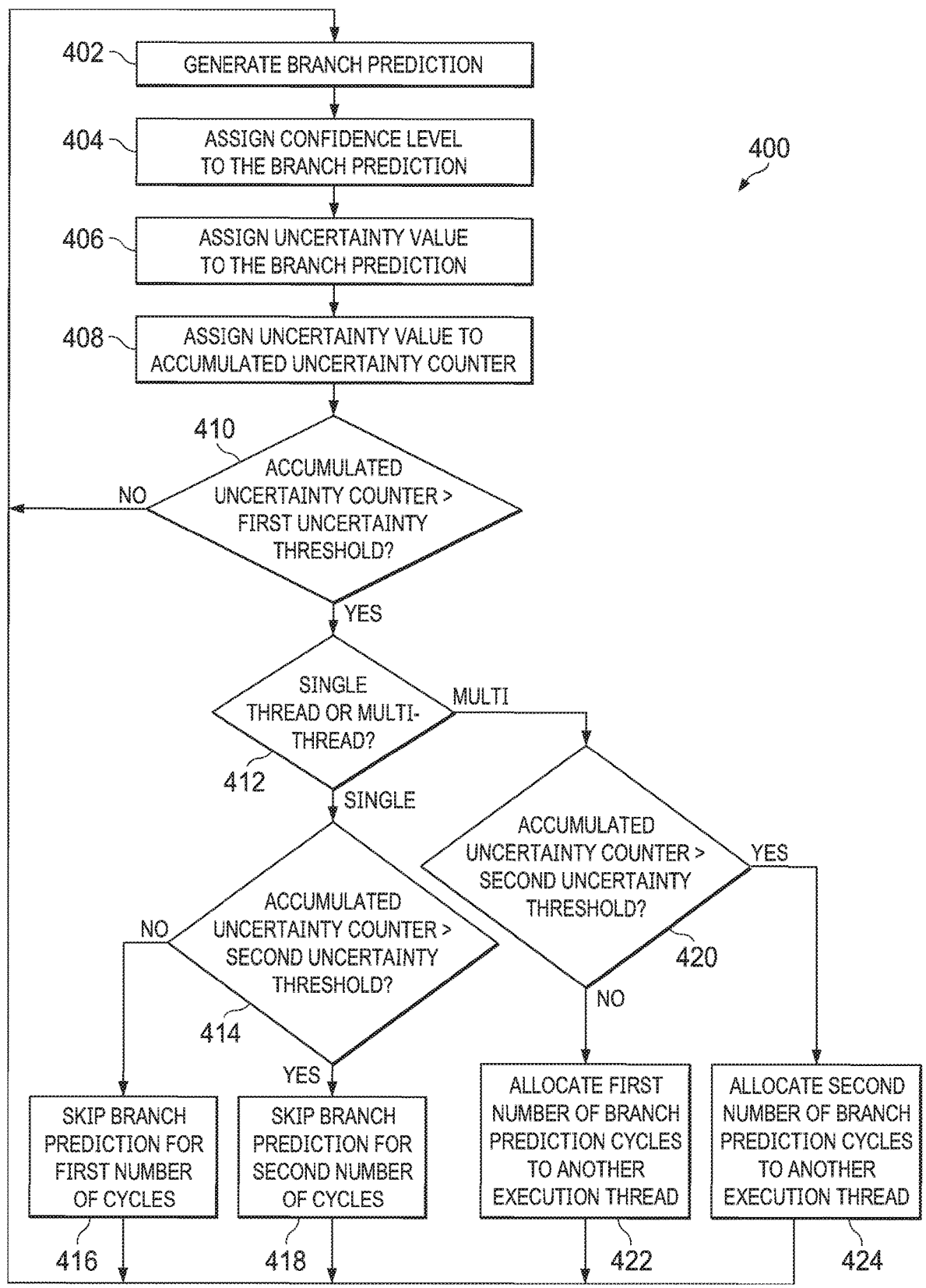
FIG. 4 is a flow diagram of a method for throttling a branch prediction pipeline in accordance with some embodiments.

FIG. 4 is a block diagram illustrating a method 400 for throttling a branch prediction pipeline in accordance with some embodiments. The method 400 is implemented in some embodiments of the branch prediction pipeline 122 and processor 100 shown in FIG. 1.

At block 402, the branch predictor 108 generates a branch prediction for an execution thread. At block 404, the conditional predictor 128 assigns a confidence level for the branch prediction generated by the branch predictor 108. In some embodiments, the conditional predictor 128 assigns a confidence level for each branch prediction generated by the branch predictor 108 that relates to the probability that the current prediction made at the head of the speculation stream is not going to be flushed. In one embodiment, the conditional predictor 128 performs prediction confidence grading and classifies each branch prediction as a high-confidence prediction, a medium-confidence prediction, or a low-confidence prediction.

At block 406, the processor 100 assigns an uncertainty value to the branch prediction generated by the branch predictor 108. In some embodiments, the processor 100 assigns the uncertainty value for each branch prediction based at least in part on the confidence level assigned by the conditional predictor 128 at block 404 and a number of dynamic branches predicted.

At block 408, the uncertainty accumulator 130 adds the uncertainty value of the branch prediction from block 406 to an accumulated uncertainty counter associated with the branch predictor 108. In some embodiments, each different execution thread executing at the processor 100 is associated with a separate accumulated uncertainty counter. The uncertainty accumulator 130 is incremented at the back end of the branch prediction pipeline 122. Additionally, the uncertainty value assigned to a branch prediction is subtracted from the accumulated uncertainty counter when the corresponding branch prediction is retired or flushed from the branch prediction pipeline 122. That is, the accumulated uncertainty counter is decremented when branch predictions are no longer in flight in the processor 100. In various embodiments, uncertainty values are accumulated in a thread specific counter for all predicted blocks in flight as follows: add uncertainty value at predict time; subtract uncertainty value at retire time; and reset the uncertainty counter on redirects.

Thus, the various stages of the branch prediction pipeline 122 include assigning an uncertainty value to each prediction and accumulating the uncertainty values across all the predictions that are in flight by adding the uncertainty value of new predictions at the uncertainty accumulator 130 stage and subtracting the uncertainty of predictions that are retired or flushed. The accumulated uncertainty counter provides a measure of confidence as to whether the processor 100 is predicting along the correct path.

At block 410, a new cycle of prediction begins and the throttle unit 124 determines whether the accumulated uncertainty counter exceeds a first uncertainty threshold. If the throttle unit 124 determines that the accumulated uncertainty counter does not exceed a first uncertainty threshold, the method 400 returns to block 402 for a new cycle of prediction. However, if the throttle unit 124 determines that the accumulated uncertainty counter does exceed a first uncertainty threshold, the method 400 proceeds to block 412.

At block 412, the throttle unit 124 determines whether the processor 100 is operating in a single-thread mode or a multi-thread mode for purposes of determining how to throttle operations of the branch prediction pipeline 122. If the throttle unit 124 determines that the processor 100 is operating in a single-thread mode, the method 400 proceeds to block 414. At block 414, the throttle unit 124 determines whether the accumulated uncertainty counter exceeds a second uncertainty threshold. If the throttle unit 124 determines that the accumulated uncertainty counter exceeds the first uncertainty threshold (from block 410) but does not exceed the second uncertainty threshold, the throttle unit 124 skips branch prediction at block 416 for a first number of cycles, such as previously discussed in more detail relative to FIG. 2. If the throttle unit 124 determines that the accumulated uncertainty counter exceeds the first uncertainty threshold (from block 410) and also exceeds the second uncertainty threshold, the throttle unit 124 skips branch prediction at block 418 for a second number of cycles greater than the first number of cycles, such as previously discussed in more detail relative to FIG. 2.

If the throttle unit 124 determines that the processor 100 is operating in a multi-thread mode at block 412, the method 400 proceeds to block 420. At block 420, the throttle unit 124 determines whether the accumulated uncertainty counter exceeds a second uncertainty threshold. If the throttle unit 124 determines that the accumulated uncertainty counter exceeds the first uncertainty threshold (from block 410) but does not exceed the second uncertainty threshold, the throttle unit 124 allocates a first number of branch prediction cycles to a different execution thread (block 422), such as previously discussed in more detail relative to FIG. 3. If the throttle unit 124 determines that the accumulated uncertainty counter exceeds the first uncertainty threshold (from block 410) and also exceeds the second uncertainty threshold, the throttle unit 124 allocates a second number of branch prediction cycles greater than the first number of cycles to a different execution thread (block 424), such as previously discussed in more detail relative to FIG. 3.

As shown, each of the blocks 416, 418, 422, and 424 return to block 402 for subsequent new cycles of prediction. Although throttling occurs when the accumulated uncertainty counter increases above the various uncertainty thresholds, branch prediction returns to previous prediction rates if the accumulated uncertainty counter falls back below the uncertainty thresholds. As previously discussed, the uncertainty value for each of the plurality of branch predictions is subtracted from the accumulated uncertainty counter when each of the plurality of branch predictions is retired or flushed from the branch prediction pipeline. The accumulated uncertainty counter starts decreasing as instructions are retired. As instructions retire, if the instructions retire without having seen any redirects, that means that the predictions made were correct. In that case, the prediction is not in flight anymore and so are subtracted from the accumulated uncertainty counter.

Thus, in a single-thread mode, when the accumulated uncertainty counter falls below the second uncertainty threshold, the throttle unit 124 instructs the branch predictor 108 to skip fewer predictions. Similarly, in a single-thread mode, when the accumulated uncertainty counter falls below the first uncertainty threshold, the throttle unit 124 instructs the branch predictor 108 to forego throttling and return to generating a new prediction each cycle. In a multi-thread mode, when the accumulated uncertainty counter falls below the second uncertainty threshold, the throttle unit 124 instructs the branch predictor 108 to allocate less processing bandwidth to the second execution thread and return the processing bandwidth to the first execution thread. Similarly, in a multi-thread mode, when the accumulated uncertainty counter falls below the first uncertainty threshold, processing bandwidth is returned back to the first execution thread which resumes generating a new prediction every other cycle.

In this manner, the branch confidence throttling discussed herein slows down threads that are less likely to be on the correct path, and by doing that, saves power by not executing instructions that are likely to be flushed. The processor yields power and compute resources to another thread that shares the same hardware within a CPU core (e.g., in a multi-thread mode) or can save power by not generating new predictions in a cycle (e.g., in a single-thread mode). Yielded power resources by a thread in a given CPU core can be exploited by threads on other CPU cores within an IC package that can dynamically allocate power across a plurality of CPU cores. In this manner, the branch confidence throttling enables more efficient use of compute resources.

In some embodiments, the apparatus and techniques described above are implemented in a system including one or more integrated circuit (IC) devices (also referred to as integrated circuit packages or microchips), such as the systems, processors, and BTB tables described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. Therefore, the particular embodiments disclosed above may be altered or modified and all such variations are considered within the scope of the disclosed subject matter. Accordingly, the protection sought herein is as set forth in the claims below.

What is claimed is:

1. A processor comprising:
   a branch predictor including one or more branch target buffer (BTB) tables;
   a branch prediction pipeline including a throttle unit and an uncertainty accumulator;

wherein:
the processor is configured to assign an uncertainty value for each of a plurality of branch predictions generated by the branch predictor;
the uncertainty accumulator is configured to add the uncertainty value for each of the plurality of branch predictions to an accumulated uncertainty counter associated with the uncertainty accumulator; and
the throttle unit is configured to instruct the branch predictor to skip prediction for one or more cycles based on the accumulated uncertainty counter exceeding one or more uncertainty thresholds.

2. The processor of claim 1, wherein the uncertainty value for each of the plurality of branch predictions is subtracted from the accumulated uncertainty counter when each of the plurality of branch predictions is retired or flushed from the processor pipeline.

3. A processor comprising:
a branch predictor including one or more branch target buffer (BTB) tables;
a branch prediction pipeline including a throttle unit and an uncertainty accumulator;
wherein:
the processor is configured to assign an uncertainty value for each of a plurality of branch predictions generated by the branch predictor;
the uncertainty accumulator is configured to add the uncertainty value for each of the plurality of branch predictions to an accumulated uncertainty counter associated with the uncertainty accumulator;
the throttle unit is configured to instruct the branch predictor to allocate processing bandwidth from a first execution thread to a second execution thread for one or more cycles based on the accumulated uncertainty counter exceeding the one or more uncertainty thresholds.

4. The processor of claim 3, wherein the throttle unit is further configured to instruct the branch predictor to return processing bandwidth for the first number of cycles from the second execution thread to the first execution thread in response to the accumulated uncertainty counter falling below the first uncertainty threshold.

5. The processor of claim 1, further comprising:
a conditional predictor configured to assign a confidence level for each of the plurality of branch predictions generated by the branch predictor, wherein the processor is configured to assign the uncertainty value for each of the plurality of branch predictions based at least in part on the confidence level.

6. A method comprising:
assigning an uncertainty value to a branch prediction generated by a branch predictor;
adding the uncertainty value of the branch prediction to an accumulated uncertainty counter associated with the branch predictor; and
skipping, based on the accumulated uncertainty counter exceeding a first uncertainty threshold, branch prediction for a first number of cycles.

7. The method of claim 6, wherein adding the uncertainty value of the branch prediction comprises:
incrementing the accumulated uncertainty counter at a back end of a branch prediction pipeline of the branch predictor.

8. The method of claim 6, further comprising:
subtracting the uncertainty value of the branch prediction from the accumulated uncertainty counter when the branch prediction is retired or flushed from the processor pipeline.

9. The method of claim 6, further comprising:
reducing a prediction rate for a first execution thread based on the accumulated uncertainty counter exceeding the first uncertainty threshold.

10. The method of claim 6, further comprising:
skipping, based on the accumulated uncertainty counter exceeding a second uncertainty threshold greater than the first uncertainty threshold, branch prediction for the first execution thread for a second number of cycles greater than the first number of cycles.

11. The method of claim 6, further comprising:
allocating processing bandwidth associated with the first number of cycles from a first execution thread to a second execution thread.

12. The method of claim 6, further comprising:
assigning a confidence level to the branch prediction; and
assigning the uncertainty value to the branch prediction based at least in part on the confidence level.

13. A method comprising:
incrementing, at an uncertainty accumulator of a branch prediction pipeline, an accumulated uncertainty counter of a first execution thread with an uncertainty value;
based at least in part on a determination that the accumulated uncertainty counter exceeds a first uncertainty threshold, allocating processing bandwidth for a first number of cycles from the first execution thread to a second execution thread.

14. The method of claim 13, further comprising:
allocating, based on the accumulated uncertainty counter exceeding a second uncertainty threshold greater than the first uncertainty threshold, processing bandwidth for a second number of cycles greater than the first number of cycles from the first execution thread to the second execution thread.

15. The method of claim 13, further comprising:
allocating, based on the accumulated uncertainty counter falling below the first uncertainty threshold, processing bandwidth for the first number of cycles from the second execution thread to the first execution thread.

16. The method of claim 13, further comprising:
assigning a confidence level to a branch prediction generated by the branch prediction pipeline; and
assigning the uncertainty value to the branch prediction based at least in part on the confidence level.

* * * * *